(12) United States Patent
Freda et al.

(10) Patent No.: US 12,556,318 B2
(45) Date of Patent: *Feb. 17, 2026

(54) METHOD AND APPARATUS FOR PERFORMING SIMULTANEOUS SIDELINK DISCONTINUOUS (DRX) AND UPLINK DRX IN NEW RADIO (NR) VEHICLE TO EVERYTHING (V2X)

(71) Applicant: INTERDIGITAL PATENT HOLDINGS, INC., Wilmington, DE (US)

(72) Inventors: Martino Freda, Laval (CA); Moon-il Lee, Melville, NY (US); Tao Deng, Roslyn, NY (US); Tuong Duc Hoang, Montreal (CA); Ghyslain Pelletier, Montreal (CA); Paul Marinier, Brossard (CA); Jaya Rao, Montreal (CA)

(73) Assignee: INTERDIGITAL PATENT HOLDING, INC., Wilmington, DE (US)

( * ) Notice: Subject to any disclaimer, the term of this patent is extended or adjusted under 35 U.S.C. 154(b) by 250 days.

This patent is subject to a terminal disclaimer.

(21) Appl. No.: 17/798,914

(22) PCT Filed: Feb. 12, 2021

(86) PCT No.: PCT/US2021/018028
§ 371 (c)(1),
(2) Date: Aug. 11, 2022

(87) PCT Pub. No.: WO2021/163617
PCT Pub. Date: Aug. 19, 2021

(65) Prior Publication Data
US 2023/0097552 A1 Mar. 30, 2023

Related U.S. Application Data

(60) Provisional application No. 63/027,003, filed on May 19, 2020, provisional application No. 62/975,500, filed on Feb. 12, 2020.

(51) Int. Cl.
*H04L 1/1867* (2023.01)
*H04L 1/1812* (2023.01)
(Continued)

(52) U.S. Cl.
CPC ............ *H04L 1/188* (2013.01); *H04L 1/1848* (2013.01); *H04W 52/0216* (2013.01); *H04W 76/28* (2018.02); *H04L 1/1812* (2013.01)

(58) Field of Classification Search
CPC ..... H04L 1/188; H04L 1/1848; H04L 1/1812; H04W 52/0216; H04W 76/28;
(Continued)

(56) References Cited

U.S. PATENT DOCUMENTS 9,762,356 B2 9/2017 Rudolf et al.
10,159,061 B2 12/2018 Zhao et al.
(Continued)

FOREIGN PATENT DOCUMENTS

CN 102625421 A 8/2012
WO 2017078783 A1 5/2017
(Continued)

OTHER PUBLICATIONS

Asustek, "Detection of SL grant," 3GPP TSG-RAN2 Meeting #88, R2-145065, San Francisco, US (Nov. 17-21, 2014).
(Continued)

*Primary Examiner* — Ayanah S George
(74) *Attorney, Agent, or Firm* — Volpe Koenig

(57) ABSTRACT

Methods and apparatus for uplink DRX and sidelink DRX are disclosed. A WTRU may receive a configuration of a hybrid automatic repeat request (HARQ) round trip time (RTT) timer. The WTRU may start the HARQ RTT timer in response to an event. The event may comprise receiving a downlink control information (DCI) that schedules a sidelink transmission. The event may comprise transmission of
(Continued)

a sidelink control information (SCI) for the sidelink HARQ process. The event may comprise receiving HARQ feedback for a sidelink transmission. The event my comprise a pre-configured time period following a physical sidelink feedback channel (PSFCH) resource for feedback associated with a HARQ transmission. The WTRU may determine a value of a timer based on a sidelink transmission property or a sidelink transmission time.

20 Claims, 7 Drawing Sheets

(51) Int. Cl.
　　*H04L 1/1829*　　　(2023.01)
　　*H04W 52/02*　　　(2009.01)
　　*H04W 76/28*　　　(2018.01)
(58) Field of Classification Search
　　CPC ... H04W 72/25; H04W 4/40; H04W 28/0236; H04W 28/04; H04W 92/18; Y02D 30/70
　　See application file for complete search history.

(56) References Cited

U.S. PATENT DOCUMENTS

| | | |
|---|---|---|
| 10,708,861 B2 | 7/2020 | Xu et al. |
| 2019/0208535 A1 | 7/2019 | Bergstrom et al. |
| 2021/0227464 A1* | 7/2021 | Kung .................. H04W 76/14 |
| 2024/0107454 A1* | 3/2024 | Lin ..................... H04W 76/14 |

FOREIGN PATENT DOCUMENTS

| | | |
|---|---|---|
| WO | 2017172479 A1 | 10/2017 |
| WO | 2019195505 A1 | 10/2019 |
| WO | 2021119474 A1 | 6/2021 |

OTHER PUBLICATIONS

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
Interdigital, Inc., "Discussion on Uu DRX for SL UE," 3GPP RAN WG2 Meeting #113 electronic, R2-2100519, Online (Jan. 2021).
Third Generation Partnership Project, "Technical Specification Group Services and System Aspects; Study on enhancement of 3GPP Support for 5G V2X Services (Release 16)," 3GPP TR 22.886 V16.2.0 (Dec. 2018).
Third Generation Partnership Project, "Technical Specification Group Services and System Aspects; Enhancement of 3GPP support for V2X scenarios; Stage 1 (Release 15)," 3GPP TS 22.186 V15.2.0 (Sep. 2017).
Third Generation Partnership Project, "Technical Specification Group Services and System Aspects; Enhancement of 3GPP support for V2X scenarios; Stage 1 (Release 16)," 3GPP TS 22.186 V16.2.0 (Jun. 2019).
Third Generation Partnership Project, "Technical Specification Group Radio Access Network; Evolved Universal Terrestrial Radio Access (E-UTRA); Physical layer procedures (Release 14)," 3GPP TS 36.213 V14.4.0 (Sep. 2017).
Third Generation Partnership Project, "Technical Specification Group Radio Access Network; Evolved Universal Terrestrial Radio Access (E-UTRA); Physical layer procedures (Release 16)," 3GPP TS 36.213 V16.0.0 (Dec. 2019).
Third Generation Partnership Project, "Technical Specification Group Services and System Aspects; Proximity-based services (ProSe); Stage 2 (Release 15)," 3GPP TS 23.303 V15.1.0 (Jun. 2018).
Third Generation Partnership Project, "Technical Specification Group Services and System Aspects; Proximity-based services (ProSe); Stage 2 (Release 16)," 3GPP TS 23.303 V16.0.0 (Jul. 2020).
Third Generation Partnership Project, "Technical Specification Group Services and System Aspects; Study on architecture enhancements for EPS and 5G System to support advanced V2X services (Release 16)," 3GPP TR 23.786 V0.8.0 (Aug. 2018).
Third Generation Partnership Project, "Technical Specification Group Services and System Aspects; Study on architecture enhancements for the Evolved Packet System (EPS) and the 5G System (5GS) to support advanced V2X services (Release 16)," 3GPP TR 23.786 V16.1.0 (Jun. 2019).
Third Generation Partnership Project, "Technical Specification Group Services and System Aspects; System architecture for the 5G System (5GS); Stage 2 (Release 16)," 3GPP TS 23.501 V16.3.0 (Dec. 2019).
Third Generation Partnership Project, "Technical Specification Group Radio Access Network; NR; Medium Access Control (MAC) protocol specification (Release 15)," 3GPP TS 38.321 V15.8.0 (Dec. 2019).
Third Generation Partnership Project, "Technical Specification Group Radio Access Network NR Radio Resource Control (RRC) protocol specification (Release 15)," 3GPP TS 38.331 V15.8.0 (Dec. 2019).
Third Generation Partnership Project, "Technical Specification Group Radio Access Network; NR; Radio Resource Control (RRC) protocol specification (Release 15)," 3GPP TS 38.331 V15.12.0 (Dec. 2020).
Third Generation Partnership Project, "Technical Specification Group Radio Access Network; NR; Radio Resource Control (RRC) protocol specification (Release 16)," 3GPP TS 38.331 V16.3.1 (Jan. 2021).
Third Generation Partnership Project, "Technical Specification Group Radio Access Network; NR; Medium Access Control (MAC) protocol specification (Release 15)," 3GPP TS 38.321 V15.11.0 (Dec. 2020).
Third Generation Partnership Project, "Technical Specification Group Radio Access Network; NR; Medium Access Control (MAC) protocol specification (Release 16)," 3GPP TS 38.321 V16.3.0 (Dec. 2020).
Third Generation Partnership Project, "Technical Specification Group Radio Access Network; NR; NR and NG-RAN Overall Description; Stage 2 (Release 16)," 3GPP TS 38.300 V16.4.0 (Dec. 2020).

(56) References Cited

OTHER PUBLICATIONS

Third Generation Partnership Project, "Technical Specification Group Radio Access Network; NR; NR and NG-RAN Overall Description; Stage 2 (Release 16)," 3GPP TS 38.300 V16.0.0 (Dec. 2019).

Third Generation Partnership Project, "Technical Specification Group Radio Access Network; Evolved Universal Terrestrial Radio Access (E-UTRA); Physical layer procedures (Release 16)," 3GPP TS 36.213 V16.4.0 (Dec. 2020).

Third Generation Partnership Project, "Technical Specification Group Services and System Aspects; Architecture enhancements for V2X services (Release 16)," 3GPP TS 23.285 V16.4.0 (Sep. 2020).

Third Generation Partnership Project, "Technical Specification Group Services and System Aspects; Architecture enhancements for V2X services (Release 16)," 3GPP TS 23.285 V16.2.0 (Dec. 2019).

Third Generation Partnership Project, "Technical Specification Group Services and System Aspects; System architecture for the 5G System (5GS); Stage 2 (Release 16)," 3GPP TS 23.501 V16.7.0 (Dec. 2020).

Huawei et al., "Sidelink physical layer procedures for NR V2X," 3GPP TSG RAN WG1 Meeting #95, R1-1812205, Spokane, USA (Nov. 12-16, 2018).

\* cited by examiner

METHOD AND APPARATUS FOR PERFORMING SIMULTANEOUS SIDELINK DISCONTINUOUS (DRX) AND UPLINK DRX IN NEW RADIO (NR) VEHICLE TO EVERYTHING (V2X)

CROSS-REFERENCE TO RELATED APPLICATIONS

This application is the U.S. National Stage, under 35 U.S.C. § 371, of International Application No. PCT/US2021/018028 filed Feb. 12, 2021, which claims the benefit of U.S. Provisional Application No. 62/975,500, filed Feb. 12, 2020, and U.S. Provisional Application No. 63/027,003, filed May 19, 2020, the contents of which are incorporated herein by reference.

BACKGROUND

Vehicular communication is a mode of communication whereby vehicles may communicate with each other directly. A scenario for Vehicle to Everything (V2X) operations is an In-coverage scenario, where a WTRU may receive assistance from a network to start transmitting and receiving V2X messages. Another scenario for V2X operations is an Out-of-coverage scenario, where a WTRU may use a pre-configured parameter or parameters to start transmitting and receiving V2X messages.

V2X communication is supported in release 14 (Rel-14) of LTE, and was inspired from previous work on Device-to-Device (D2D) communications. V2X communication services may consist of different types including: Vehicle to Vehicle (V2V) where vehicular WTRUs may communicate with each other directly; Vehicle to Infrastructure (V2I) where vehicular WTRUs may communicate with RSUs/eNBs; Vehicle to Network (V2N) where vehicular WTRUs may communicate with a core network; and Vehicle to Pedestrian (V2P) where vehicular WTRUs may communicate with WTRUs with a special condition (e.g. low battery capacity).

SUMMARY

Methods and apparatus for uplink DRX and sidelink DRX are disclosed. In an embodiment, a WTRU may receive sidelink data for transmission. The WTRU may enable physical downlink control channel (PDCCH) decoding based on the received sidelink data. The WTRU may report sidelink related information to a network. The sidelink related information reported to the network may comprise: reception of a sidelink physical sidelink control channel (PSCCH) transmission, arrival of sidelink data in a sidelink transmission buffer; and enabling or disabling sidelink discontinuous reception (DRX). The WTRU may receive, from a network, an indication that enables sidelink monitoring. The WTRU may receive a set of sidelink DRX parameters that are independent of parameters configured for Uu DRX. The WTRU may receive a scheduled sidelink grant from a network during its Uu active time (i.e., the time when the WTRU actively monitors PDCCH). The WTRU may receive a first DRX configuration associated with Uu and receive a second DRX configuration associated with sidelink DRX. The WTRU may receive a sidelink transmission that indicates a change in an activity state. The WTRU may receive a sidelink transmission that indicates a set of resources for which an indicated activity state applies. The WTRU may receive a sidelink transmission that indicates a periodicity and offset to apply to a periodic activity state. The WTRU may receive a sidelink transmission that indicates a new set of resources to monitor. The WTRU may receive a configuration of sidelink time and frequency resources to monitor for an activity state change transmission. An activity state change may be intended for a group of WTRUs. The WTRU may transmit an activity state change indication upon receiving an activity state change transmission from another WTRU.

A WTRU may determine a value of a timer associated with Uu and/or sidelink DRX based on sidelink timing information related to a sidelink transmission. The determination may be based on a PSCCH to PSFCH separation. The determination may be a function of a timing resource selected. The determination may be a function of a packet delay budget. The determination may be a function of a priority. The determination may be a function of a maximum number of retransmissions between a retransmission resource and an initial transmission resource. The determination may be a function of a time offset between a retransmission resource and an initial transmission resource.

A WTRU may inform a peer WTRU of its activity behavior on Uu. A WTRU may send parameters related to sidelink activity behavior which may be impacted or changed by Uu activity behavior. The WTRU may provide the information explicitly or implicitly. A WTRU may include parameters of its Uu DRX configuration and/or activity behavior in PC5-RRC message following establishment of a unicast link and/or at configuration of a SLRB. A WTRU may send an indication to a peer WTRU or group of peer WTRUs upon moving to DRX. A WTRU may select a physical sidelink feedback channel (PSFCH) transmission resource depending on the activity behavior or status of a peer WTRU. A WTRU may determine whether to send a sidelink reconfiguration success/failure message depending on whether the WTRU is configured with a same or similar DRX parameters on Uu and/or DRX.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
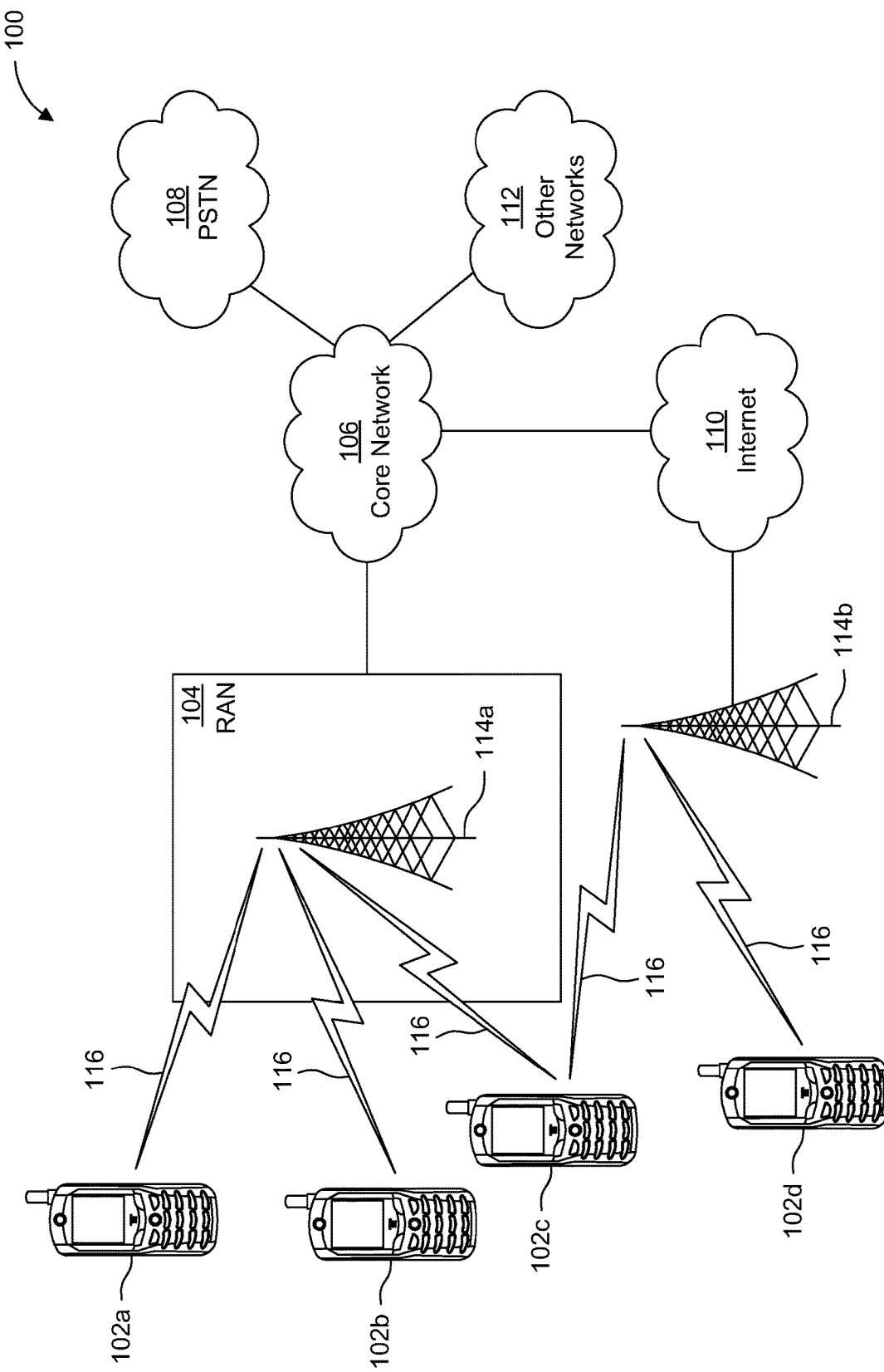
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (WTRU), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a WTRU.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
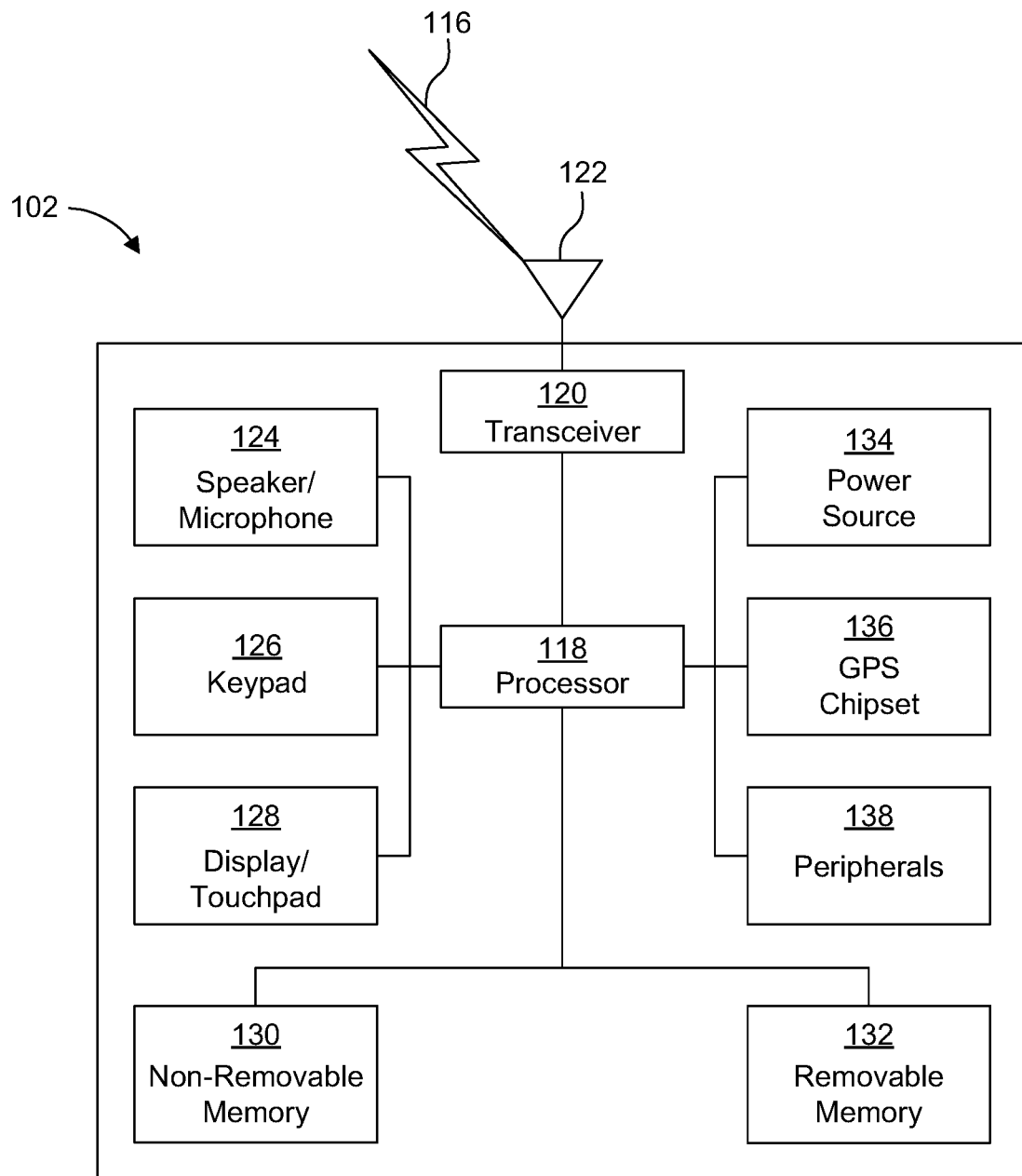
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
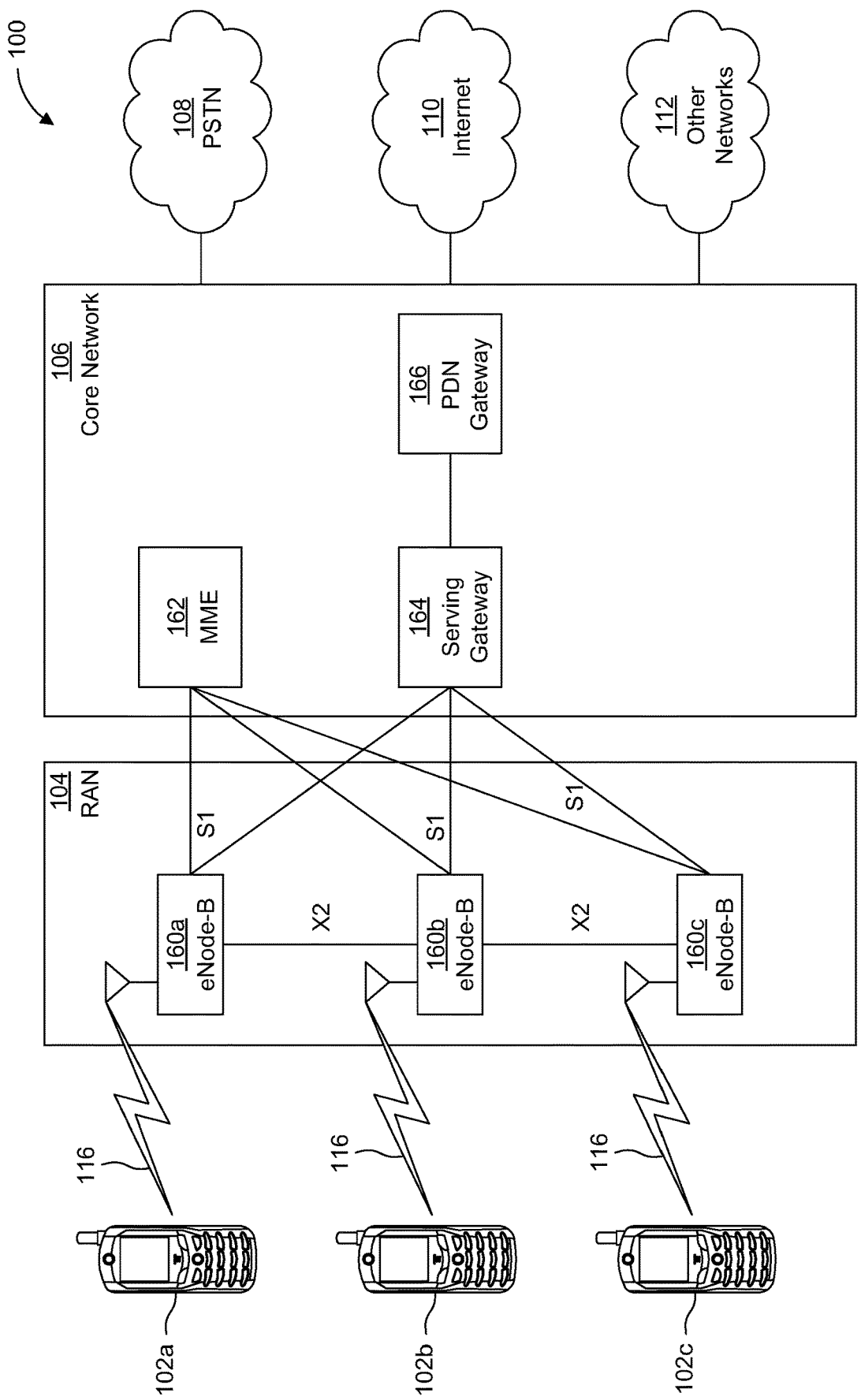
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
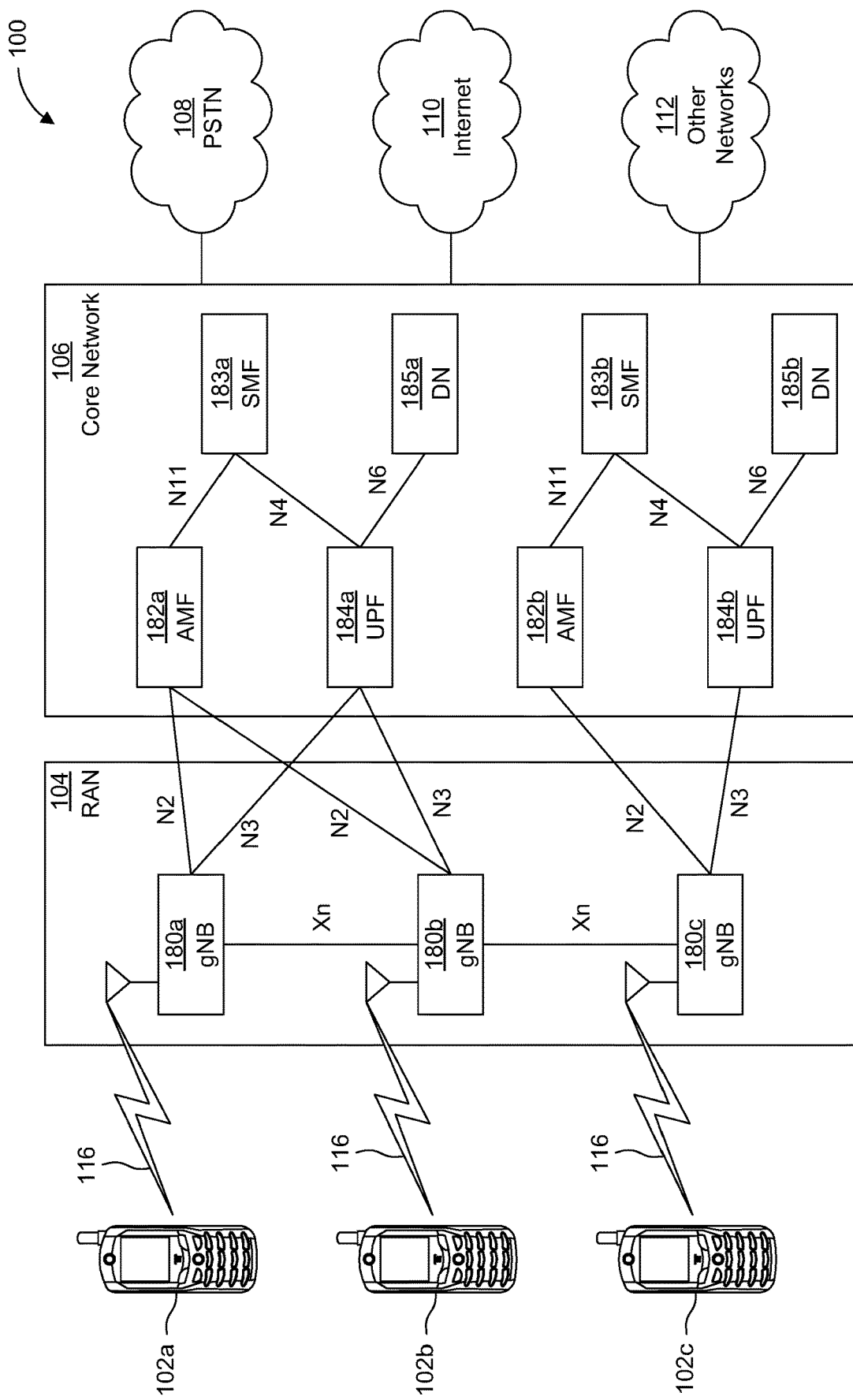
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In LTE, modes of operation in V2X communication are defined. In Mode 3, the network may provide a WTRU with a scheduling assignment for V2X sidelink transmission. In Mode 4, a WTRU may autonomously select the resources from a configured/pre-configured resource pool. There are two categories of resource pools defined in V2X LTE: receiving pools which may be monitored for receiving V2X transmission, and transmitting pools which may be used by WTRUs to select the transmission resource in Mode 4. Transmitting pools are not used by WTRUs configured in Mode 3.

In LTE, the resource pools may be semi-statically signaled to a WTRU via RRC signaling. In Mode 4, the WTRU may use sensing before selecting a resource from the RRC configured transmitting pool. LTE V2X does not support dynamic resource pool reconfiguration. Pool configuration may only be carried via SIB and/or dedicated RRC signaling.

3GPP is currently working on the next generation of wireless systems called "New Radio" (NR). NR systems are expected to support a number of use cases such as enhanced Mobile Broadband (eMBB) and ultra-high reliability and low latency communications (URLLC). Completion of NR Rel-15 work item is expected in June 2018.

3GPP is expected to approve a study item to support enhanced V2X (eV2X) communication in NR systems. eV2X in NR is expected to support new services for both safety and non-safety scenarios (e.g. sensor sharing, automated driving, vehicle platooning, remote driving). Different eV2X services may require different performance requirements. For some scenarios, a 3 ms latency may be required NR V2X is expected to support new use cases. One use case expected to be supported is Vehicles Platooning which may enable vehicles to dynamically form a group travelling together. All the vehicles in the platoon may receive periodic data from a leading vehicle in order to carry on platoon operations. This information may allow a distance between vehicles to become extremely small (i.e., a gap distance translated to time can be very low (sub second)). Platooning applications may allow the vehicles following to be autonomously driven.

Another use case expected to be supported is Advanced Driving which may enable semi-automated or fully-automated driving. Longer inter-vehicle distance may be assumed. Each vehicle and/or roadside unit (RSU) may share data obtained from its local sensors with vehicles in proximity, thus allowing vehicles to coordinate their trajectories or maneuvers. Each vehicle may share its driving intention with vehicles in proximity. The benefits of this use case group include safer traveling, collision avoidance, and improved traffic efficiency.

Another use case expected to be supported is Extended Sensors which may enable the exchange of raw or processed data gathered through local sensors or live video data among vehicles, RSUs, devices of pedestrians and V2X application servers. The vehicles may enhance the perception of their environment beyond what their own sensors can detect and have a more holistic view of the local situation.

Another use case expected to be supported is Remote Driving which may enable a remote driver or a V2X application to operate a remote vehicle for passengers who cannot drive themselves or a remote vehicle located in dangerous environments. For a case where variation is limited and routes are predictable, such as public transportation, driving based on cloud computing may be used. Access to cloud-based back-end service platforms may be considered for this use case group.

SA2 has begun to describe a QoS model for NR V2X. In Rel-14 V2X, as documented in 3GPP TS 23.285, the QoS over PC5 is supported with the ProSe Per-Packet Priority (PPPP). An application layer is allowed to mark the packets with the PPPP, which may indicate a required QoS level. Certain enhancement were added (e.g. by allowing deriving of PDB from the PPPP).

New QoS requirements for NR V2X are described in 3GPP TS 22.186. The new performance KPIs were specified with the following parameters: payload (bytes); transmission rate (message/sec); reliability (%); data rate (Mbps); minimum required communication range (meters).

The same set of service requirements may apply to both PC5 based V2X communication and Uu based V2X communication. These QoS characteristics may be represented with 5QI as defined in 3GPP TS 23.501.

SA2 has proposed the possibility to have a unified QoS model for PC5 and Uu (i.e. also use 5QIs for V2X communication over PC5), such that the application layer may have a consistent way of indicating QoS requirements regardless of the link used.

Considering the 5GS V2X capable WTRUs, there are three different types of traffic: broadcast, multicast, and unicast.

For unicast traffic, a same QoS model as that of Uu may be utilized (i.e. each of the unicast link may be treated as a bearer and QoS flows may be associated with it). The QoS characteristics defined in 5QI and an additional parameter of a data rate may apply. A minimum required communication range may be treated as an additional parameter specifically for PC5 use. Similar consideration may apply to multicast traffic, as it may be treated as a special case of unicast (i.e. with multiple defined receivers of the traffic).

For broadcast traffic, there may be no bearer concept. Therefore, each message may have different characteristics according to an application requirement. The 5QI may then be used in the similar manner as that of the PPPP/PPPR (i.e. to be tagged with each of the packet). 5QI may be able to represent all the characteristics needed for the PC5 broadcast operation (e.g. latency, priority, reliability, etc). A group of V2X broadcast specific 5QIs (i.e. VQIs) may be defined for PC5 use.

The PC5 QoS parameters may be negotiated at the establishment of a one-to-one communication procedure. The one-to-one communication establishment procedure is enhanced to support PC5 QoS parameter negotiation between two WTRUs. After the PC5 QoS parameters negotiation procedure, a same QoS may be used in both directions.

Figure 2:
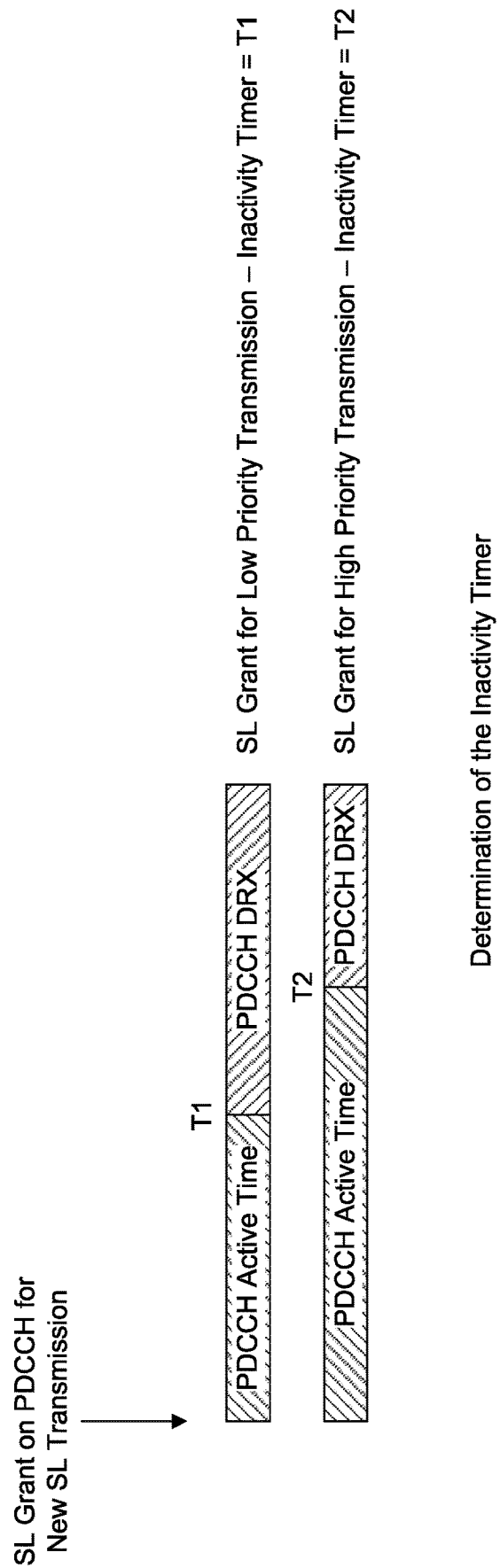
FIG. 2 is a diagram illustrating one exemplary method to determine a value of a timer.

WTRUs engaged in one to one communication may negotiate PC5 QoS parameters during a link establishment procedure as shown in FIG. 2. A first WTRU (WTRU-1) may send a Direct Communication Request message to a second WTRU (WTRU-2) in order to trigger mutual authentication. This message may include the requested PC5 QoS parameters. WTRU-2 may initiate a procedure for mutual authentication. WTRU-2 may include the accepted PC5 QoS parameters in a Response message.

CONNECTED mode DRX is specified for power savings in NR Uu for a WTRU in RRC_CONNECTED. DRX may be based on a configured schedule of wake up times at the WTRU. If the WTRU receives a PDCCH scheduling during its wakeup time, it may remain awake for a certain time until no further scheduling is received. The WTRU may be configured with a drx-onDurationTimer, which may indicate a duration at the beginning of a DRX Cycle. The WTRU may be configured with a drx-SlotOffset which may indicate a delay before starting the drx-onDurationTimer. The WTRU may be configured with a drx-InactivityTimer which may indicate a duration after the PDCCH occasion in which a PDCCH indicates a new uplink or downlink transmission for the MAC entity. The WTRU may be configured with a drx-RetransmissionTimerDL (per downlink HARQ process except for the broadcast process) which may indicated a maximum duration until a downlink retransmission is received. The WTRU may be configured with a drx-RetransmissionTimerUL (per uplink HARQ process), which may indicate a maximum duration until a grant for uplink retransmission is received. The WTRU may be configured with a drx-LongCycleStartOffset which may indicate a Long DRX cycle and drx-StartOffset which may define the subframe where the Long and Short DRX cycle starts. The WTRU may be configured with a drx-ShortCycle (which may be optional) which may indicate a Short DRX cycle. The WTRU may be configured with a drx-ShortCycleTimer (which may be optional) which may indicate a duration the WTRU shall follow the Short DRX cycle. The WTRU may be configured with a drx-HARQ-RTT-TimerDL (per downlink HARQ process except for the broadcast process) which may indicate a minimum duration before a downlink assignment for HARQ retransmission is expected by the MAC entity. The WTRU may be configured with a drx-HARQ-RTT-TimerUL (per uplink HARQ process) which may indicate a minimum duration before an uplink HARQ retransmission grant is expected by the MAC entity.

A WTRU configured with DRX may determine its Uu active time (i.e., the time when the WTRU actively monitors PDCCH). When a DRX cycle is configured, the Uu active time may include a time while drx-onDurationTimer or drx-InactivityTimer or drx-Retransmission TimerDL or drx-RetransmissionTimerUL or ra-ContentionResolutionTimer is running. When a DRX cycle is configured, the Uu active time may include a time while a Scheduling Request is sent on a PUCCH and is pending. When a DRX cycle is configured, the Uu active time may include a time while a PDCCH indicating a new transmission addressed to the C-RNTI of the MAC entity has not been received after successful reception of a Random Access Response for the preamble not selected by the MAC entity.

Another power savings mechanism that was introduced in LTE V2X, for use by pedestrian WTRUs, was an aspect of partial sensing. With partial sensing, a WTRU may be configured by upper layers with a minimum number of candidate subframes in a resource selection window [T1, T2], where the specific subframes may be selected by WTRU implementation. The WTRU may perform sensing only on subframes in the sensing window which may be an integer number of reservation periods from the candidate subframes, thus reducing the amount of resources the WTRU may need to perform sensing on in the sensing window.

Another possibility for pedestrian WTRUs is to perform random selection on a resource pool. If a resource pool is configured for random selection, the WTRU may perform selection of resources without considering any sensing results during the sensing procedure.

A WTRU performing sidelink (SL) transmission for which power savings should be ensured may also be in DRX on Uu. Procedures to ensure consistent power savings on both Uu and sidelink together needs further consideration. In order to align network scheduling for SL with the SL activity time, knowledge of SL activity by the network may be required. Alignment of DRX between a group of WTRUs where the group may be in partial coverage (i.e. some WTRUs are in coverage while other WTRUs are out of coverage) may be required when a WTRU aligns its Uu DRX and SL DRX.

A WTRU may determine an activity behavior on sidelink in order to reduce power consumption of a WTRU performing sidelink transmissions. Activity behavior may be determined dynamically by the WTRU (e.g. based on measurements on sidelink and/or reception and/or transmission of data from upper layers or peer WTRUs) or it may be configured by the network. The network may configure a set of measured values (e.g. of a sidelink measurement) and the corresponding activity behavior to be applied by the WTRU. The WTRU may change its activity behavior as a result of an event related to reception of data (e.g. from a peer WTRU, or from upper layers for transmission), or reception of an explicit indication to change such activity behavior.

Activity behavior may comprise a DRX cycle that indicates a periodicity of wakeup when performing DRX. Activity behavior may comprise one or more timers associated with DRX behavior in Uu DRX or similar, such as: an inactivity timer associated with sidelink transmission; an on duration timer associated with sidelink transmissions; a slot offset; a retransmission timer; a HARQ RTT timer; a DRX short cycle timer. Activity behavior may comprise a length of a sensing window for sensing of a resource pool for mode 2 resource allocation. Activity behavior may comprise a number of candidate subframes in the resource selection window that may be considered by the WTRU for transmission (as resulting sensing resources). Activity behavior may comprise a number of subchannels, number of frequency resources, the initial, the last subchannel/frequency resource to be considered for sensing and/or resource allocation. Activity behavior may comprise a number of candidate frequency resources or subchannels that may be considered by the WTRU for transmission. Activity behavior may comprise the offset(s) of one or multiple sensing and/or resource selection subframes. For example, the WTRU may determine to perform sensing in subframes n1+j*P, where n1 is an offset to the SFN, j is an integer value and P is a fixed/(pre-)configured value. Activity behavior may comprise a number of repetitions performed by the WTRU, possibly of the same TB, possibly in order to reach other WTRU(s) which are in DRX. Activity behavior may comprise an amount of resources and/or the resource pool(s) that may be used for reception/transmission/sensing. For example, the WTRU may be configured with multiple activity states (e.g. low, high, medium, etc), and may transition between such states based on any of the events described herein.

Activity behavior may be determined based on reception and/or measurement of a trigger by the WTRU, similar to reception of PDCCH for Uu DRX. A WTRU may reset an inactivity timer, or have any behavior which modifies its activity behavior as a result of any of: reception of an SCI, whereby the SCI may be an SCI which schedules data and/or an SCI which performs announcement of future scheduled data; reception of a DCI scheduling sidelink; reception of a sidelink wakeup signal (e.g. special SCI indicating wakeup only); reception of SL SSB/PBCH; reception of a data PDU on sidelink, where such data PDU may further be conditioned in terms of the property of the PDU or the contents of the PDU. For example, the WTRU may have a first behavior (e.g. reset an inactivity timer) when the PDU includes data from a logical channel, and may have a second behavior (e.g. does not reset an inactivity timer) when the PDU includes control information (e.g. MAC CE, CSI feedback, PC5 RRC, etc).

Methods for common uplink (UL) and SL DRX are disclosed. Aligning UL DRX with SL activity behavior may be used to ensure common activity times for SL and UL traffic when the WTRU is in RRC_CONNECTED. In such a case, a WTRU may only need to turn on analog digital components/transceivers once, whether they are used for Uu traffic or for sidelink traffic.

A WTRU may determine its PDCCH decoding Uu active time based on sidelink transmission/reception. A WTRU may determine its sidelink transmission/reception based on PDCCH decoding active time.

A WTRU may extend, modify, and/or determine its PDCCH decoding on duration based on sidelink related triggers related to transmission or reception. A WTRU may extend, modify, and/or determine its PSCCH decoding times on sidelink based on triggers related to Uu DRX.

In an embodiment, a WTRU may maintain independent timers/counters related to Uu DRX, to determine a Uu active time, and may also maintain independent timers/counters related to SL DRX, to determine SL active time. The WTRU may determine its sidelink activity behavior (using these separate timers) based on whether it is scheduled with DCI with SL or Uu grant. Specifically, a WTRU may determine the value of a timer depending on whether such timer is triggered by a DCI which schedules Uu or SL transmissions.

For example, a WTRU may be configured with separate inactivity timers values on Uu related to Uu and SL scheduling. If the WTRU receives DCI scheduling for SL, it starts the inactivity timer with the value related to SL. If the WTRU receives DCI scheduling for Uu, it starts the inactivity timer with the value associated to Uu.

For example, a WTRU may be configured with separate HARQ RTT timer/retransmission timer values and use these appropriate value of the HARQ RTT/retransmission timer depending on whether the HARQ process is associated with scheduling of Uu or SL.

In another example, the WTRU may be configured with separate timers associated with Uu DRX (a timer associated with SL and timer associated with Uu). The WTRU may maintain these timers independently. The WTRU may control these timers based on the associated scheduling (i.e. DCI scheduling sidelink controlling the sidelink timer, and DCI scheduling Uu controlling the Uu timer). The activity behavior of the WTRU with respect to Uu may then be as follows: (1) The WTRU may monitor SL-RNTI (possibly only) in the Uu active time corresponding to SL, and non-SL-RNTI in the Uu active time corresponding to Uu or (2) the WTRU may monitor Uu if either active time/timer is running (Uu or SL).

A WTRU may determine that the WTRU is active (i.e. performs both PDCCH monitoring and PSCCH monitoring) if either an UL DRX procedure or a SL DRX procedure, or both, indicate the WTRU should be active.

In an embodiment, a WTRU may perform SL decoding based on Uu DRX activity behavior, and may modify/update parameters (e.g. timers) related to Uu DRX upon a SL event. For example, a WTRU may reset a timer related to UL scheduling (e.g. existing or new activity timer) upon occurrence of any or a combination of the following events. The WTRU may receive PSCCH/PSCCH with data intended for/decoded by the WTRU. The WTRU may receive a DCI on a PDCCH that indicates a new SL transmission. For example, the WTRU may restart a drx-InactivityTimer if the PDCCH indicates a new UL or DL or SL transmission. The WTRU may determine the activity time on both UL and SL based on the existing drx-InactivityTimer. The WTRU may receive HARQ feedback in response to its transmission. This may further depend on the type of HARQ feedback such as a reception of NACK only, ACK only, DTX or NACK. The WTRU may receive a CSI request from a peer WTRU. The WTRU may receive a CSI feedback from a peer WTRU. The WTRU may transmit SCI/data on SL. Such transmission may correspond to a first transmission. Such first transmission may correspond to a transmission that has an associated retransmission resource, and associated HARQ feedback resource, and/or an associated reserved resource for a new transmission. The WTRU may transmit HARQ feedback in response to a received TB. This may further depend on a type of HARQ feedback such as NACK only, ACK only, DTX or NACK. A measured CBR may increase by a certain amount, or increases above a threshold.

In an embodiment, a WTRU may enable PDCCH decoding as a result of the arrival of SL data for transmission. A WTRU in Uu DRX (i.e. waiting for the start of a Uu on duration) may perform decoding of PDCCH upon the arrival of SL data for transmission. Uu decoding may start at the arrival of the data. Uu decoding may start at the time corresponding to or closest to the SL resource selected for the transmission of such data. A WTRU, upon enabling PDCCH decoding, may start the DRX activity timer associated to SL or UL (or both) as a result of the SL data arrival/transmission.

In an embodiment, a WTRU may be configured with a HARQ_RTT timer for a SL HARQ process for which HARQ feedback may be enabled. The WTRU may start the HARQ RTT timer for a SL HARQ process at any of the following instances: (1) upon reception of a DCI that schedules a sidelink transmission, for example a sidelink transmission for the specific HARQ process; (2) upon transmission of an SCI for the specific HARQ process; (3) upon reception of HARQ feedback for a SL transmission; (4) upon transmission of the SL HARQ feedback to the network on PUCCH; and (5) at some fixed or preconfigured time period (e.g. a next slot) following a physical sidelink feedback channel (PSFCH) resource for feedback associated with the HARQ transmission.

When (or whether) a WTRU starts a Uu activity timer (and the value of the timer), the Uu activity timer may further depend on configuration of SL. In a further example, when (or whether) a WTRU starts a Uu activity timer and the value of the timer may further depend on the configuration of SL, such configuration may further include: (1) whether the WTRU is configured with PSFCH on sidelink or not (e.g.

in the resource pool); (2) whether the WTRU is configured with PUCCH for transmission of SL HARQ feedback to the network or not; and/or (3) whether a HARQ process is configured with HARQ enable or disabled.

In one example, when the WTRU resets the HARQ RTT for the SL HARQ process, the WTRU may start the HARQ RTT timer upon transmission of the HARQ feedback on PUCCH when the WTRU is configured to transmit PUCCH to the network, or may start the HARQ RTT timer upon reception of SCI or reception of HARQ feedback for SL when PUCCH is not configured. The WTRU may further be configured with different HARQ RTT timer values for each of these two cases.

In another example, when the WTRU resets the HARQ RTT for the SL HARQ process, the WTRU may start the HARQ RTT timer upon transmission of SCI for the HARQ process when PSFCH is not configured (or when the SL HARQ process has HARQ disabled), and may start the HARQ RTT timer upon reception of the SL HARQ feedback when PSFCH is configured (or when the SL HARQ process has HARQ enabled).

In yet another example, a WTRU may not use the HARQ RTT timer when defining the active time (i.e. the does not sleep during HARQ RTT) if the WTRU is configured without PUCCH for reporting SL HARQ feedback, or configured without PSFCH, or when the HARQ process has HARQ feedback disabled.

A WTRU may be configured to determine a value of a timer based on a SL transmission property or a SL transmission time. A WTRU may determine a value of a timer associated with Uu DRX and/or SL DRX based on SL timing information related to a SL transmission.

A WTRU may determine a value of a timer (e.g. HARQ RTT timer) based on a PSCCH to PSFCH separation. For example, the WTRU may determine the value of a HARQ RTT timer by adding a PSCCH to PSFCH separation to a network configured value.

A WTRU may determine a value of a timer (e.g. Inactivity timer) as a function of a timing of a resource selected, for example in mode 2.

A WTRU may determine a value of a timer (e.g. retransmission timer) as a function of a packet delay budget (PDB), a priority, T2, or similar parameter associated with latency on sidelink.

A WTRU may determine a value of a timer (e.g. retransmission timer) as a function of a maximum number of retransmissions and/or a time offset between a retransmission resource and an initial transmission resource.

FIG. 2 illustrates one examples for how a WTRU may determine a value of a timer. The WTRU may determine the inactivity timer associated with Uu DRX based on the priority of the SL transmission to be performed. Specifically, the amount of time the WTRU may stay awake to monitor PDCCH for SL scheduling following a DCI may depend on the priority of the data the WTRU transmits on sidelink. For example, the WTRU may be configured with a first inactivity timer (T1) to be used for a priority value P1, and a second inactivity timer (T2) to be used for a priority value P2. Upon reception of DCI during the active period, where such DCI schedules SL, the WTRU may set the Uu inactivity timer to the value which corresponds to the priority of the data it transmits on sidelink.

Figure 3:
FIG. 3 is a diagram illustrating one exemplary method to determine a value of a timer.

FIG. 3 illustrates another example for how a WTRU may determine a value of a timer. As shown in FIG. 3, the WTRU may determine the value of a Uu retransmission timer based on the priority and/or PDB (packet delay budget) of the retransmission being performed on SL. Specifically, the WTRU may receive a grant on PDCCH for transmission on Sidelink (SL grant). The WTRU reports NACK on PUCCH (e.g. following reception of a NACK from the peer WTRU on SL), the WTRU may set a retransmission timer which depends on the PDB and/or priority of the packet transmitted on sidelink. For example, the WTRU may be configured with a the value of a Uu retransmission timer for one or a given set of SL priority. In the figure below, the WTRU is configured with a retransmission timer ReTX1, which corresponds to a priority and/or PDB associated with the packet it selects for transmission on sidelink using that grant. The WTRU may start the retransmission timer some time (e.g. HARQ RTT) following transmission of NACK on PUCCH. For the second retransmission (in case NACK is reported following the second grant in the figure), the WTRU may set the retransmission timer for ReTX2 to be the remaining PDB. The WTRU may determine the value of retransmission timer ReTX2 in two ways: (1) by subtracting the elapsed time the remaining value of ReTX1 since ReTX1 was stopped or (2) by determining the remaining PDB for the packet (based on its priority) and setting ReTX2 to the value of the remaining PDB A WTRU may report information related to SL activity behavior to the network. In an embodiment, a WTRU may report information related to, or indicating, the activity behavior over sidelink to the network. Such reporting may allow the network to align the UL DRX with the SL Activity behavior at WTRUs in an RRC_CONNECTED. A WTRU may report any of the following information related to sidelink while in RRC_CONNECTED.

A WTRU may report reception of a SL PSCCH/PSSCH transmission. For example, a WTRU may report the reception and/or successful decoding of a SL PSCCH/PSSCH to the network. Such reception may be reported by a dedicated PUCCH resource (e.g. SR transmission or similar PUCCH resource), in a BSR transmission, in a MAC CE, or in an RRC transmission. Such indication may further be reported when the received PSCCH/PSSCH changes a behavior related to the activity behavior of the WTRU on sidelink and/or UL, such as extending the common UL/SL active time, changing between different configured periods of wakeup time, etc. For example, such report may be sent when the reception occurs in the last N slots of the WTRU's on duration on Uu. For example, such report may be sent when the reception represents the first SL reception of the on duration of the WTRU, while the WTRU has not received any DL/SL grants from the network during that on duration. For example, such report may be sent when the reception causes a reset of an activity timer. For example, such report may be sent when the reception causes extension of the active time compared to what would be dictated from DL/SL scheduling.

A WTRU may report arrival of sidelink data to be transmitted at the WTRU's SL TX buffers. For example, a WTRU may report the arrival of new data in the WTRU's SL TX buffers while the WTRU operates in mode 2 and in RRC_CONNECTED. For example, such report may be performed by the WTRU if it is currently in DRX with respect to Uu.

A WTRU may report the WTRU's own or peer WTRUs activity behavior or any related parameters. For example, a WTRU may report its own on duration time, current SL DRX periodicity, inactivity timer value, or similar parameters associated with another WTRU, which it may have learned from another WTRU. For example, a WTRU may report an index associated with a resource pool corresponding to the activity behavior of a peer WTRU (e.g. received in PC5-RRC). For example, a WTRU may report a change in any of the above activity behavior parameters, such as the resetting of a timer, change in the periodicity of the SL DRX, etc.

A WTRU may report that the WTRU enables/disables SL DRX. For example, a WTRU's upper layers may disable SL DRX at some point. The WTRU may report such event/indication to the network.

A WTRU may report events which may result in a change in the SL activity behavior due to a relationship between such event and the defined SL activity behavior at the WTRU, such as: a change in CBR, by a preconfigured amount; a change in a sensing metric (e.g. number or percentage of available resources, average RSSI of resources in the sensing window, etc.); a change of coverage situation of a peer WTRU or group of WTRUs, as informed by another WTRU.

A WTRU may inform a peer WTRU or group of peer WTRUs of its activity behavior on Uu such as a change in Uu behavior activity. A WTRU may provide a peer WTRU or group of peer WTRUs with parameters or values related to a DRX state, an indication of events which affect a scheduled period of PDCCH monitoring, and the like. A WTRU may send parameters related to sidelink activity behavior which may be impacted or changed by Uu activity behavior. The WTRU may provide the information explicitly (for example, in PC5-RRC, sidelink MAC CE, SCI, or in a dedicated control channel) or implicitly (for example, derived from a result of another sidelink transmission).

A WTRU may send an indication and/or parameters to a peer WTRU or group of peer WTRUs at any of the following: upon reception of a DRX MAC CE for Uu received by the network; at the establishment of a unicast or groupcast session or link with a peer WTRU or group of peer WTRUs; upon expiration, reset, or start of a timer related to Uu DRX, such as an on-duration timer, an inactivity timer, a short cycle timer, etc; upon reception or absence of a wakeup signal (WUS); upon configuration or reconfiguration of DRX parameters by Uu (e.g. reception of an RRC reconfiguration where DRX is (re)configured; upon reception of Uu scheduling that resets an inactivity time.

A WTRU may include parameters of its Uu DRX configuration and/or activity behavior in PC5-RRC message following establishment of a unicast link and/or at configuration of a SLRB. The WTRU may include configured timers/parameters, such as any of the drx-onDurationTimer, drx-SlotOffset, drx-InactivityTimer, drx-RetransmissionTimerDL, drx-RetransmissionTimerUL, drx-LongCycleStartOffset, drx-ShortCycle, drx-ShortCycleTimer, drx-HARQ-RTT-TimerDL, drx-HARQ-RTT-TimerUL. The WTRU may include one or more SL DRX parameters (e.g. a selected DRX pattern or a resource pool or pool index defining the WTRU's activity behavior) which may be determined by the WTRU from the Uu DRX parameters.

A WTRU may trigger a PC5-RRC message upon change of any of the above mentioned parameters.

A WTRU may send an indication (e.g. via SCI, SL MAC CE, PC5-RRC) to a peer WTRU or group of peer WTRUs upon moving to DRX. For example, the WTRU may send the indication upon expiration of a drx-InactivityTimer, or drx-onDurationTimer, without reception of a DCI. For example, the WTRU may send the indication upon reception of a DRX MAC CE.

A WTRU may perform behavior upon reception of activity behavior, such as a change in activity behavior.

The WTRU may report the parameters, or subset of the parameters, described above to the network (e.g. in a Sidelink WTRU information message or a WTRU assistance information message). For example, the WTRU may perform resource selection or re-selection and may take into account the received information. For example, the WTRU may restrict or prioritize resource selection among the resources which correspond to an on-duration (or period of time when a peer WTRU is expected to monitor a PDCCH) of a peer WTRU on Uu. For example, the WTRU may exclude or de-prioritize in resource selection, the resources which correspond to the off duration (or period of time when the peer WTRU is not expected to monitor a PDCCH) of the peer WTRU on Uu.

The WTRU may select a PSFCH transmission resource depending on the activity behavior or status of a peer WTRU. For example, the WTRU may determine the PSFCH resource for transmission of HARQ feedback depending on whether the WTRU is actively monitoring Uu PDCCH. For example, the WTRU may select a PSFCH resource which falls in a peer WTRU's active time, based on the activity behavior information received.

The WTRU may determine whether to send a SL reconfiguration success/failure message depending on whether the WTRU is configured with a same or similar DRX parameters on Uu and/or DRX. For example, the WTRU may compare the received DRX parameters with its own Uu DRX parameters and may trigger a SL reconfiguration failure based on a condition relating the two configurations (e.g. percentage of common slots of on-duration below a threshold.

A WTRU may adjust SL transmission timing based on Uu DRX activity. In embodiment, a WTRU may adjust its schedule of SL transmissions to ensure such transmissions are aligned with Uu active time. The WTRU may perform any of the following actions to align SL transmissions with Uu DRX activity: resource selection by including only the resources which fall in the WTRUs Uu active time (e.g. resources in the Uu on duration time); dropping SL packet/transmission when the WTRU's next Uu active time occurs after the required latency of the packet; resource reselection for SL transmission upon the extension of its active time on Uu, for example, due to reception on PDCCH.

A WTRU may receive an indication from the network about whether SL monitoring is allowed or required. In an embodiment, a WTRU may receive an indication from the network to allow, enable, or disable SL monitoring, for a defined period of time, and/or until reception of a next indication. Such period of time may be preconfigured or indicated within the network indication. For example, a WTRU may receive a network indication (e.g. a DCI, MAC CE, or RRC message) indicating the WTRU to start or stop SL monitoring from the time of reception of the indication and for a period of time indicated within the indication itself. Such period of time may correspond to the WTRUs Uu on duration. For example, a WTRU may receive a network indication (e.g. a DCI, MAC CE, or RRC message) which indicates to the WTRU whether to perform SL monitoring during the WTRU Uu on duration. In the absence of such signal for a given on duration, the WTRU may monitor PDCCH but may not monitor PSCCH in the next or current on duration of Uu. In the presence of such signal, the WTRU may monitor both PDCCH and PSCCH in the next or current on duration of Uu. For example, such signal may be transmitted in conjunction with the wakeup signal for Uu. The WTRU may receive two separate indications during the wakeup signal timing such as a Uu wakeup signal and a SL wakeup signal. If the WTRU receives both SL and UL wake up signals, the WTRU may perform both PSCCH and PDCCH decoding during the on duration. If the WTRU receives only the SL (UL) wake up signal, the WTRU may perform only PSCCH (PDCCH) decoding during the on duration.

A WTRU may be configured with a subset of Uu on duration for monitoring a specific L2 ID/service. In an embodiment, a WTRU may receive a configuration mapping a portion of the Uu on duration or active time with one or a set of L2 IDs or services. Such L2 IDs may represent an identification of a group of sidelink WTRUs. A WTRU may determine whether to perform monitoring of SL-RNTI and/ or SL monitoring and/or SL transmission associated with a specific L2 ID in a portion of the on duration if allowed based on such configuration. The on duration may be subdivided into N portions. A WTRU may determine whether to perform SL monitoring in an nth portion of the on duration if it has transmissions or expects receptions (based on upper layer configuration) for one or more of the L2 IDs associated with the nth portion. The WTRU may perform only Uu PDCCH decoding in the nth portion of the on duration if it is not interested in any L2 IDs configured for the nth portion. An advantage of such a solution is that it further restricts transmissions associated with one or more L2 IDs to occur within a subset of resources in the on duration, thus limiting the blind decoding on Uu and SL monitoring of PSCCH of WTRUs which may be interested in a subset of services. A WTRU may further restrict a selected destination (e.g. in an LCP procedure) for transmission in a network SL grant within the nth portion of the on duration such that only allowed destination for that portion may be selected.

Methods for allowing UL and SL DRX to operate independently of each other are disclosed. A WTRU may be configured to perform independent Uu PDCCH decoding and PSCCH decoding depending on independent SL and UL DRX states. A WTRU may be configured with an activity behavior for sidelink or a set of sidelink DRX parameters independent of the parameters configured for Uu. A WTRU may perform the following operations on Uu and SL channels in each of the following scenarios. If a slot falls within a Uu active time but outside of a SL active time: the WTRU may perform PDCCH decoding for RNTI other than SL-RNTI; the WTRU may not perform PSCCH decoding; and the WTRU may perform PSFCH decoding and/or transmission. If a slot falls within a SL active time but outside of a Uu active time: the WTRU may perform PDCCH decoding for SL-RNTI only; the WTRU may perform PSCCH decoding; and the WTRU may decode PSFCH and/or transmit on PSFCH. If a slot falls within both a SL active time and UL active time: the WTRU may perform PDCCH decoding for UL/DL and SL RNTIs; the WTRU may perform PSCCH decoding; and the WTRU may perform PSFCH decoding and/or transmission.

A WTRU may perform independent maintenance of counters or timers related to SL/UL based on the events associated with each scenario. A WTRU may reset an inactivity timer associated with SL DRX if it receives a PDCCH indicating a new SL transmission or it receives/decodes a SL SCI from PSCCH. A WTRU may determine its on duration time for SL, defined as a period in which the WTRU decodes SL and/or UL for SL assignments, based on a SL-specific DRX cycle, SL-specific DRX offset, and a SL-specific on duration timer.

A WTRU may receive a network scheduled SL grant only during periods of active PDCCH decoding on Uu. Such SL DCI may be applied to a future time. In an embodiment, a WTRU may receive a network scheduled SL grant only during Uu DRX active time. The WTRU may apply such grant at some time during the next SL active period determined by SL DRX. A WTRU may determine the timing of the SL grant within the SL activity period, explicitly in the grant itself, or implicitly based on any or a combination of: a timing of the reception of the SL grant within the Uu activity period; a QoS, L2 destination ID; a frequency/ subchannel resources associated with the SL grant; a MCS or range of MCS in the SL grant.

The SL grant may include an indication that instructs the WTRU whether to apply the SL grant immediately or apply it within the next SL activity period. The SL grant may include a slot offset, which may correspond to the offset from the beginning of the SL activity period in which the SL grant should be applied. The WTRU may implicitly apply the SL grant to a slot offset within the SL activity period, whereby such slot offset may correspond to the slot offset within the Uu activity period in which the SL grant was received.

Dynamic determination of DRX configuration for PDCCH monitoring is disclosed. A WTRU may be configured with one or more DRX configurations. A first DRX configuration may be used or applicable for a DCI scheduling Uu (e.g., downlink or uplink) and a second DRX configuration may be used or applicable for a DCI scheduling sidelink (e.g., NR V2X Mode-1). A DRX configuration may be associated with an RNTI. For example, one or more DRX configurations may be configured and each DRX configuration may be associated with an RNTI which may be a CRC scrambled with a DCI. A WTRU may monitor a PDCCH carrying a DCI with a first RNTI based on the first DRX configuration and the WTRU may monitor a PDCCH carrying a DCI with a second RNTI based on the second DRX configuration. A DRX configuration for Uu may be determined based on a mode of operation for sidelink. For example, a first DRX configuration for Uu may be used when a WTRU operates sidelink with Mode-1 and a second DRX configuration for Uu may be used when a WTRU operate sidelink with Mode-2. Mode-1 may be referred to as in-network sidelink operation and Mode-2 may be referred to as out-of-network sidelink operation.

A WTRU may be configured with one or more DRX configurations for Uu (e.g., downlink and/or uplink) A DRX configuration may be determined based on whether DRX configuration for sidelink is activated or not. For example, a first DRX configuration may be used when sidelink DRX is activated and a second DRX configuration may be used when sidelink DRX is deactivated. A DRX configuration may be determined based on sidelink operation mode. For example, one or more sidelink operation modes may be used including normal power consumption mode and power saving mode. A first DRX configuration may be used for Uu when sidelink operation mode is a normal power consumption mode and a second DRX configuration may be used for Uu when sidelink operation mode is a power saving mode. A DRX configuration may be determined based on sidelink traffic type. A DRX configuration may be determined based on worst case QoS of sidelink traffic expected. A DRX configuration may be determined based on service type for sidelink. A DRX configuration may be determined based on cast type for sidelink (e.g., broadcast, unicast, groupcast). A DRX configuration may be determined based on WTRU speed (e.g., absolute speed or relative speed).

A WTRU may skip monitoring PDCCH when both Uu and sidelink in off-duration. A WTRU may be configured with a first DRX configuration for Uu and a second DRX configuration for sidelink. The first DRX configuration may be the same as the second DRX configuration or different from the second DRX configuration. A WTRU may skip monitoring PDCCH in a slot if the WTRU is not in active time for the first DRX configuration and/or the second DRX configuration. A time where a WTRU is not in active time may be referred to as inactive time. Inactive time may be interchangeably used with off-duration, off-time, no PDCCH monitoring time, inactive slot, sleeping time, and sleeping duration. A WTRU may skip monitoring when the WTRU is in inactive time for all DRX configurations configured. For example, if the WTRU is in inactive time for a slot which may be within a time window for both the first DRX configuration and the second DRX configuration. Otherwise, the WTRU may monitor PDCCH.

Reception activity at a WTRU based on explicit signaling is disclosed. Power savings behavior at the WTRU may be signaled explicitly by a transmission indicating the desired/intended behavior. A WTRU may receive a sidelink transmission that may indicate a change in the activity state of a WTRU or group of WTRUs. In an embodiment, a WTRU may receive an explicit transmission on sidelink which may change the WTRU's activity state. A WTRU may perform any of the following upon reception of an explicit transmission. Upon reception of an explicit transmission, a WTRU may move from monitoring a receiving resource pool for SCI to not monitoring a receiving resource pool for SCI, or vice versa. Upon reception of an explicit transmission, a WTRU may change the receiving resource pool on which the WTRU monitors SCI. For example, the WTRU may go from monitoring a first receiving pool before reception of the sidelink transmission, to monitoring a second receiving pool after reception of the sidelink transmission. Upon reception of an explicit transmission, a WTRU may move from monitoring a receiving pool with one activity behavior (e.g. a first set of or percentage of time and/or frequency resources) to a second activity behavior (e.g. a second set or percentage of time and/or frequency resources). Upon reception of an explicit transmission, a WTRU may change one or more parameters associated with the activity behavior, as defined herein. Upon reception of an explicit transmission, a WTRU may change one or more parameters related to sensing, such as, increase or decrease the sensing window, increase or decrease the amount of resources on which the WTRU performs sensing, apply or not apply sensing to a particular set of resource or pool. Upon reception of an explicit transmission, a WTRU may perform PSCCH decoding, such as for a specific L1/L2 ID at a (pre)configured or (pre)defined set of resources or with some time periodicity, for a period of time associated with the validity of the activity state change indication. For example, the activity state change indication may further indicate if the WTRU should monitor sidelink relative to the schedule dictated by the scheduling based activity determination for the next X seconds, where X seconds could be the periodicity of the activity state indication transmission.

Any of the above information (e.g. the specific activity state to move to, or the parameter to be applied) may be implicitly or explicitly included in the transmission itself. For example, the activity state change transmission may comprise an indication for the WTRU to move into or out of out of a power savings state, or to change the activity state. The activity state change transmission may comprise a set of resources for which the indicated activity state should apply. For example, the transmission may comprise a starting slot or time from which the activity state should be changed. For example, the transmission may comprise a set of resources (e.g. a time period or a resource pool) on which a specific activity state (e.g. regular monitoring of the sidelink resource, reduced power monitoring of the sidelink resource pool, regular collection of sensing results) should be applied. The activity state change transmission may comprise a new periodicity and/or offset to be applied for a periodic activity state. The activity state change transmission may comprise a set of resources (new set or resources) on which to monitor such as for the activity state change signal. For example, the WTRU may determine the resource pool to monitor based on indication of such in the activity state change indication. For example, the WTRU may determine the time/frequency resources (e.g. DRX cycle, on duration, etc.) to monitor based on indication of such in the activity state change indication. The activity state change transmission may comprise a duration for the applied new activity state (e.g. how long the recipient WTRU of the indication should stay in regular reception mode). Such duration may be (pre)configured or (pre)determined (i.e. the WTRU may remain in regular reception mode for a time period X following reception of an activity state indication). The activity state change transmission may comprise a group for which the activity state change indication applies to.

A WTRU may monitor for activity state change transmission in a defined set of time/frequency resources. A WTRU may be (pre)configured with a set of sidelink time/frequency resources on which to monitor for the activity state change signal/transmission. The (pre)configured resources may be a (pre)configured sidelink resource pool. For example, a WTRU can be (pre)configured with a sidelink resource pool in which to send and/or receive an activity state change signal. Such resource pool may be reserved for transmission of an activity state change transmission. The (pre)configured resources may be a (pre)defined or (pre)configured set of slots and/or subchannels within a receiving resource pool used also for data. For example, a WTRU may be (pre)configured with a set of slots within a resource pool in which the WTRU may expect to receive the activity state change transmission. The (pre)configured resources may be a (pre)defined or (pre)configured set of slots and/or subchannels relative to a received control/data transmission. For example, a WTRU may be (pre)configured to monitor for activity state change transmission a subchannel/slot located in a time/frequency resource relative to a past or future data transmission by another WTRU, or relative to a future reserved resource of another WTRU.

Reception of activity state change transmission may be intended for a subset of WTRUs. An activity state change transmission may be intended for a group or subset of WTRUs. The transmission may result in changes of the activity state for: specific group of WTRUs, represented by a L2 ID or L1 ID associated with the group; a specific WTRU in a unicast link, represented by the destination L2 ID or L1 ID of the unicast link; a specific broadcast service, represented by the L2 ID associated with that broadcast service, or the L1 ID derived from such L2 ID; a set of WTRUs configured with a common activity state parameter, such as all WTRUs configured to monitor for the activity state change transmission on a specific resource pool, time/frequency resource set, etc.

Activity state change for a group of WTRUs may change activity for all groups. A WTRU may determine its overall activity state (e.g. sidelink monitoring, sensing behavior, etc.), based on an activity state change indication of at least one interested L2. Upon reception of an activity state change indication for a particular group, the WTRU may change its activity behavior for all groups/transmissions. For example, a WTRU may be in a first activity state (e.g. monitoring only for an activity state indication) and may receive an indication to move to normal/regular monitoring/reception. The WTRU may then perform sidelink PSCCH channel monitoring for all L1 IDs following reception of the indication.

Activity state change for a group of WTRUs may change activity with respect to that group. A WTRU may determine its activity state (e.g. sidelink monitoring, sensing behavior, etc.) for each of its interested L2 ID/L1 ID based on the activity state indication specific to that L2/L1 ID. For example, upon reception of an activity state change indication during the first activity state (e.g. monitoring only for an activity state indication), a WTRU may perform sidelink PSCCH channel monitoring only for the associated L1 ID (i.e. it may perform control channel decoding only for the L1 ID that has allowed regular monitoring). The WTRU may continue to not monitor for other L1 IDs in the WTRUs set of interested L1 IDs, and monitoring of these L1 IDs may be further subject to reception of another activity state change indication.

Signaling of the activity state change indication. An activity state change may comprise a transmission addressed only to the WTRUs it is intended for. The activity state change may be addressed to a globally known/(pre)configured destination ID, and may include the intended WTRU(s) or WTRU group(s) within the contents of the transmission. The activity state change transmission may comprise of any of the following. The activity state change transmission may comprise an SCI-only transmission addressed to the identifier (e.g. the L1 ID or L2 ID) of the subset of WTRUs it applies to. The SCI itself may have an indicator that further identifies the new activity to be applied. For example, the first or second stage SCI may include an index of the intended activity state. The SCI itself may have an indicator identifying this transmission (i.e. SCI transmission) is an activity state change indication. For example, the first or second stage SCI may have an explicit bit indicating the SCI (and potentially associated PSSCH transmission) is associated with an activity state change indication. The SCI may have an indication of the time/frequency resources in which the state change may be applied. For example, the first stage SCI may carry an indicator flagging the SCI as an activity state indication change, and the associated resource allocation may indicate the time/frequency resource associated with the start/end of the activity state change. The activity state change transmission may comprise an SCI-only transmission addressed to a globally unique L1 ID, and comprising the L1 ID(s) of the WTRU(s) or group(s) to which the activity state change may be applied. For example, the activity state change, and the identification of the WTRUs to which it applies (e.g. L1/L2 group IDs), may be carried in the second stage SCI, where the first stage SCI may comprise the globally unique identifier. For example, the activity state change indication may be carried in the first stage SCI, and the second stage SCI may carry the L1 ID(s) to which the activity state change applies to. The activity state change transmission may comprise an SCI transmission which additionally reserves resources for data transmissions. For example, the activity state change may comprise of an indicator in the first stage SCI. The activity state change transmission may comprise a SL MAC CE, or SL RRC message comprising the identifier (e.g. the L1 ID or L2 ID) of the subset of WTRUs it applies to.

In an embodiment, an activity state change transmission may indicate a change in the transmission state for the set of WTRUs which are configured to receive a specific L2/L1 ID. For example, a WTRU may be configured to receive sidelink transmissions associated with a specific L2/L1 ID (e.g. a groupcast destination, or a broadcast service). The WTRU may operate in an activity state (i.e. sidelink monitoring only in the resources that may include an activity state change). When receiving an activity state change transmission indicating a specific L2/L1 ID, the WTRU may change its activity state to a second state (i.e. monitoring all sidelink resources in a resource pool). If a WTRU is not configured to receive the specific L2/L1 ID(s) indicated in the activity state change transmission, it may not change its activity state upon reception of the indication.

A WTRU may relay the activity state change transmission received from another WTRU. In an embodiment, a WTRU may be configured to transmit an activity state change indication upon reception of an activity state change transmission from another WTRU. Such behavior may be useful, for example, to avoid half-duplex issues associated with reception of the state change indication and/or misdetection of the activity state change indication (e.g. due to fading or physical distance spanned by a group of WTRUs). A WTRU which receives an activity state change indication in a set of dedicated resources (e.g. time/frequency resources or resource pool) may further transmit the indication in the same set of resources. A WTRU may perform transmission of the activity state change indication upon reception of the activity state change under certain conditions. For example, the WTRU may transmit an activity state change indication following reception of such under any or a combination of any of the following conditions. The WTRU may perform transmission of the activity state change indication on a condition that the L1/L2 ID associated with the activity state change indication matches one of the L1/L2 IDs the WTRU is interested in receiving/transmitting. The WTRU may perform transmission of the activity state change indication on a condition that the WTRU is configured by upper layers to re-transmit or relay such activity state indication. The WTRU may perform transmission of the activity state change indication on a condition that the received power/energy associated with the received activity state change indication is lower than a (pre)configured or (pre)defined threshold. The WTRU may perform transmission of the activity state change indication on a condition that the L1/L2 ID associated with the activity state change indication is associated with a specific type of group and/or size of group, as per upper layers. For example, the WTRU may perform such transmission if the group size associated with the L1/L2 ID is known/unknown and/or is above/below a threshold. The WTRU may perform transmission of the activity state change indication on a condition that the timing of the reception of the activity state change indication meets certain criteria. For example, the WTRU may be configured with a time window for reception of the activity state change indication, and may relay the indication if it is received within the first X slots of such time window. The WTRU may perform transmission of the activity state change indication on a condition that the measured congestion of the resources, possibly associated with transmission of the activity state change indication, meets some criteria. For example, the WTRU may be configured with a threshold CBR above/below which it will relay the indication.

A WTRU may adapt activity behavior based on received sensing results from peer WTRUs. In embodiment, a transmitting WTRU may send its sensing and/or resource allocation information to a peer WTRU via RRC or MAC CE. The information may include one or any combination of the following: the set of subframes and/or subchannels resources used for resource selection; the set of subframes and/or subchannels used for sensing for the purpose of resource selection; the set selected resources for the following transmission. Based on this information, a receiving WTRU may adapt its reception activity such as DRX configuration or the sensing resources. The transmitting WTRU may determine to send its sensing and resource allocation information periodically and/or based on one or any of the following triggers: the WTRU perform resource (re-)selection; CBR is greater and/or lower than a threshold; the WTRU receives a grant (e.g., from gNB or peer WTRU). For example, in V2X, when the transmitting WTRU determines to perform resource reselection of one sidelink process for a unicast service, it may send the set of subframes used for resource selection in the next period to the receiving WTRU. The receiving WTRU may change its sensing subframes accordingly to monitor the data from the transmitting WTRU.

Figure 4:
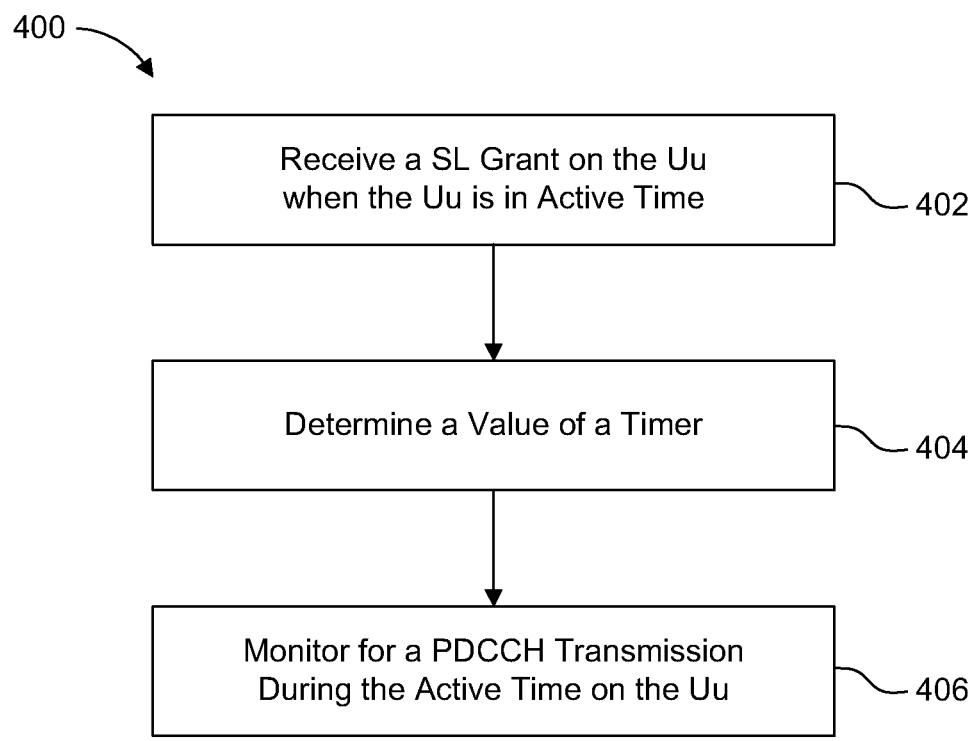
FIG. 4 is flowchart illustrating one exemplary method for determining an active time on a Uu.

FIG. 4 illustrates an exemplary method 400 implemented in a first WTRU. At 402, the first WTRU may receive a SL grant on the Uu. At 404, the first WTRU may determine a value of a timer, wherein the timer defines the active time on the Uu based on one or more attributes of SL data. At 406, the first WTRU may monitor for a PDCCH transmission during the Uu active time on the Uu.

In one embodiment, a first WTRU may determine its Uu active time with respect to SL activity between itself and a second WTRU so as to send a retransmission signal to the second WTRU. To make this determination, the first WTRu may receive an SL grant during the Uu active time. The first WTRU may transmit SL data to the second WTRU based on the SL grant. The first WTRU determines a value of a timer, which defines an active time for retransmission based on one or more attributes of the SL data. During the Uu active time, the first WTRU may monitor for a PDCCH transmission associated with the Uu.

In one example, the timer may be an inactivity timer. If the timer is an inactivity timer, the Uu active time may be based on the priority of the SL data. For example, higher priority data will receive a longer Uu active time than lower priority data. In another example, the timer may be a retransmission timer, which may start upon the WTRU reporting a SL HARQ feedback over the Uu. In one embodiment, the WTRU may reset the timer each time it receives an additional SL grant. Furthermore, the one or more attributes of the SL data may be a function of the remaining PDB of the SL data.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed:

1. A method for discontinuous reception (DRX) for use in a wireless transmit/receive unit (WTRU) configured for sidelink (SL) communication, the method comprising:
receiving DRX configuration information from a peer SL WTRU;
accepting the received DRX configuration information; and
reporting, based on the WTRU having a radio resource control (RRC) connection to a base station, to the base station indicating that the WTRU accepted the received DRX configuration information from the peer SL WTRU and indicating the accepted DRX configuration information including at least a SL on-duration timer and a SL DRX slot offset.

2. The method of claim 1, further comprising:
transmitting a message to the peer SL WTRU in response to the accepted DRX configuration information, wherein the message indicates that the WTRU accepted the received DRX configuration information.

3. The method of claim 1, wherein the DRX configuration information comprises timer information, wherein the timer information comprises at least one of: a SL on-duration timer, a SL inactivity timer, a SL HARQ RTT timer, or a SL HARQ retransmission timer.

4. The method of claim 1, wherein the DRX configuration information is SL DRX configuration information.

5. The method of claim 1, wherein the accepting the received DRX configuration information comprises setting a SL active time value.

6. The method of claim 1, wherein the WTRU is in an RRC_CONNECTED mode.

7. The method of claim 1, further comprising:
receiving the DRX configuration information via PC5 signaling.

8. The method of claim 1, further comprising:
maintaining independent timers related to Uu DRX and SL DRX.

9. The method of claim 1, wherein the reporting that the WTRU accepted the DRX configuration information is sent in a SL information element.

10. The method of claim 1, wherein the base station is a gNB.

11. A wireless transmit/receive unit (WTRU) configured for sidelink (SL) communication, the WTRU comprising:
a transceiver; and
a processor, wherein:
the transceiver is configured to receive DRX configuration information from a peer SL WTRU;
the processor is configured to accept the received DRX configuration information; and
the transceiver is further configured to report, based on the WTRU having a radio resource control (RRC) connection to a base station, indicating to the base station that the WTRU accepted the received DRX configuration information and indicating the accepted DRX configuration information including at least a SL on-duration timer and a SL DRX slot offset.

12. The WTRU of claim 11, wherein:
the transceiver is further configured to transmit a message to the peer SL WTRU in response to the accepted DRX configuration information, wherein the message indicates that the WTRU accepted the received DRX configuration information.

13. The WTRU of claim 11, wherein the DRX configuration information comprises timer information, wherein the timer information comprises at least one of: a SL on-duration timer, a SL inactivity timer, a SL HARQ RTT timer, or a SL HARQ retransmission timer.

14. The WTRU of claim 11, wherein the DRX configuration information is SL DRX configuration information.

15. The WTRU of claim 11, wherein the processor is further configured to accept the received DRX configuration information by setting a SL active time value.

16. The WTRU of claim 11, wherein the WTRU is in an RRC_CONNECTED mode.

17. The WTRU of claim 11, wherein the transceiver is further configured to receive the DRX configuration information via PC5 signaling.

18. The WTRU of claim 11, wherein the processor is further configured to maintain independent timers related to Uu DRX and SL DRX.

19. The WTRU of claim 11, wherein the transceiver is further configured to report that the WTRU accepted the DRX configuration information in a SL information element.

20. The WTRU of claim 11, wherein the base station is a gNB.

* * * * *